July 16, 1929. W. J. LILLY ET AL Re. 17,374

HOIST CONTROL

Original Filed Oct. 9, 1922 4 Sheets-Sheet 1

Inventors
W. J. Lilly
and H. H. Logan
By Williams, Bradbury,
McCaleb & Hinkle
Attorneys July 16, 1929. W. J. LILLY ET AL Re. 17,374
HOIST CONTROL
Original Filed Oct. 9, 1922 4 Sheets-Sheet 2
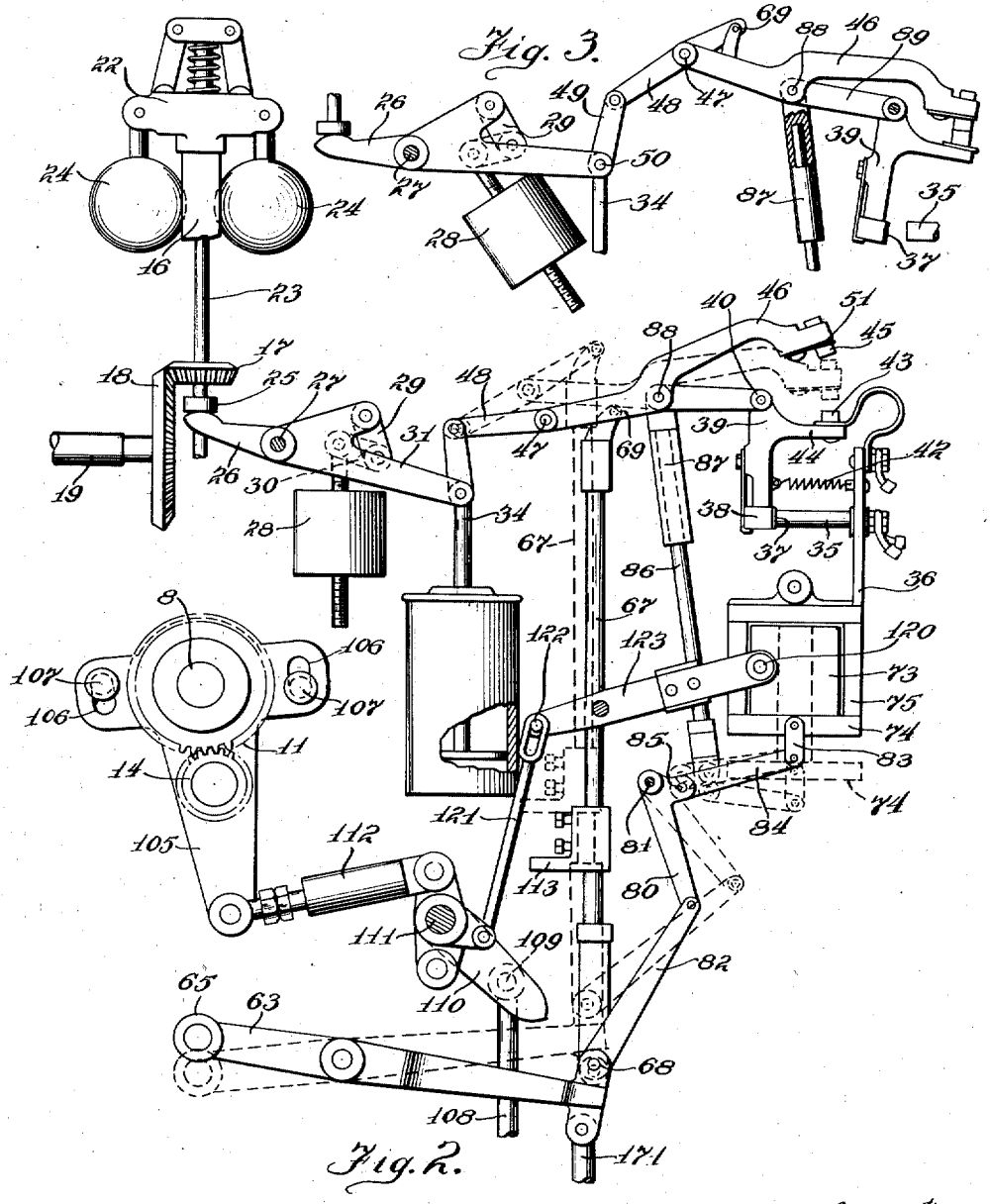
Inventors.
W. J. Lilly
and H. H. Logan
By Williams, Bradbury,
McCaleb & Hinkle
Attorneys.

July 16, 1929. W. J. LILLY ET AL Re. 17,374

HOIST CONTROL

Original Filed Oct. 9, 1922 4 Sheets-Sheet 3

Inventors.
W. J. Lilly
and H. H. Logan
By Williams, Bradbury,
McCaleb & Hinkle
attorneys.

July 16, 1929. W. J. LILLY ET AL Re. 17,374
HOIST CONTROL
Original Filed Oct. 9, 1922 4 Sheets-Sheet 4
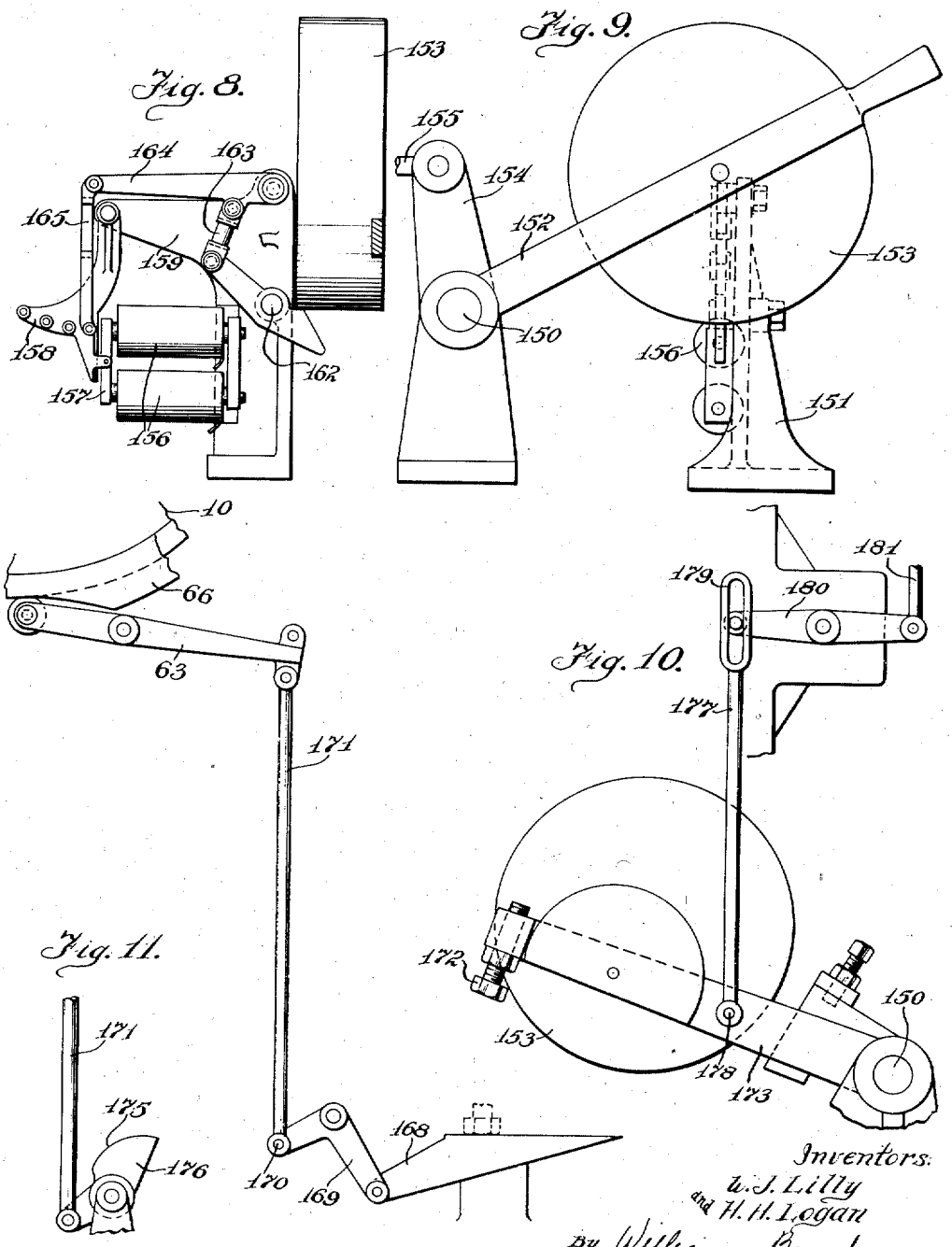
Inventors:
W. J. Lilly
and H. H. Logan
By Williams, Bradbury
McCaleb & Hinkle
Attorneys Reissued July 16, 1929. Re. 17,374

UNITED STATES PATENT OFFICE.

WILLIAM J. LILLY, OF TACOMA, WASHINGTON, AND HENRY H. LOGAN, OF CHICAGO, ILLINOIS.

HOIST CONTROL.

Original No. 1,624,260, dated April 12, 1927, Serial No. 593,466, filed October 9, 1922. Application for reissue filed June 6, 1927. Serial No. 196,795.

Our invention relates to controls in hoisting engines and mine hoist mechanisms associated therewith, such as a hoisting drum for receiving the hoist cables, a hoisting engine, a brake engine for applying brakes to the hoist drum, and an electrical signal mechanism for indicating the position of the various instrumentalities of the controller.

An object of our invention is to provide a hoisting engine control which automatically shuts off the hoisting engine power and applies the brake mechanism when the skip or cage in the shaft exceeds a predetermined speed near either of its limits of travel, provided the engineer does not retard the speed at the proper time. It may be well to state at the present time that our improved controlling mechanism is not intended to replace the engineer, and manual control of the skip or cage, except at such times when the engineer is incapacitated or fails to operate the hoist within safe limits. It is not uncommon in the art to find the engineer or operator in charge of the mechanism incapacitated through accident or even death while on duty, in which event serious accidents might befall occupants of the cage or skip or to the hoisting mechanism and persons about the mechanism.

A further object of our invention is to provide a hoisting engine control in which means is provided for first giving an audible signal to the engineer if the skip or cage exceeds the speed consistent with safety, and if the engineer fails to properly reduce the speed, to open a switch, which will shut off the hoisting engine and apply the brake mechanism.

A further object of our invention is to provide a hoisting mechanism in which an audible alarm is given just prior to the cage or skip reaching its limits of travel, so that the engineer may know in advance that the hoisting engine must be stopped, and the brakes applied.

A further object of our invention is to provide a hoisting mechanism in which means is provided for setting the brakes for the hoisting drum gradually, if the cage or skip is at points intermediate its full length of travel, and for causing the relatively quick application of the brakes if the cage or skip is adjacent to either of its limits of travel.

A further object of our invention is to provide a hoisting engine control which may be manually manipulated for maintaining a speed consistent with the safety of men when riding in the skip or cage, or which may be operated to maintain a speed unsafe for men but proper for the hoisting of coal or ore. Means is provided with this equipment which we choose to call a man-safety equipment for visibly indicating to men at the various landings of the shaft and its limits of travel that the man-safety mechanism is in operative position. It is therefore improbable that men would step into the cage knowing that the man-safety mechanism is not in operation.

A further object of our invention is to provide a hoisting engine control which has means for adjusting the control mechanism by rotating the entire cam supporting dials forming a part thereof, upon their support, thereby compensating for any variation in the length of the hoist cables, as by changes in temperature. (A cable stretches rapidly when first put on, but gradually less as it is used.)

A further object of our invention is to provide a hoisting engine control in which means is provided for permitting the rapid movement of the skip or cage when adjacent to one of its limits of travel but moving in a reverse direction. We have therefore stated that our control device presents excessive speed of the skip or cage toward its limits of travel, but this is only when the skip or cage is moving in the direction of its limit of travel. In order that no time may be lost in accelerating a skip filled with ore when starting the trip, it is important that the skip move as quickly as desired, and to this end we have devised an accelerating mechanism for permitting movement of the skip or cage in a direction away from the limit unretarded by safety mechanism.

A further object of our invention is to provide a hoisting engine control in which the entire cam supporting dials may be manually adjusted at will by the engineer simultaneously with the application of the man-safety speed mechanism. This is for the purpose of limiting the skip or cage to a safe speed for handling men and also for stopping the cage at the man landing and not the rock landing, which is usually at a point higher than the man landing.

A further object of our invention is to provide a hoisting engine control that is automatic in its operation, that is durable in construction, which requires very little care when properly installed, and which is thoroughly efficient in carrying out its purpose.

Other objects and advantages will appear in the following specification, and the novel features of the invention will be particularly pointed out in the appended claims.

Our invention is illustrated in the accompanying drawings, forming part of this application, in which Figure 1 is a side elevation of an embodiment of our invention, a portion thereof being broken away, and the switch cover removed.

Figure 2 is a fragmentary view of a portion of the mechanism illustrated in Figure 1, Figure 3 is a fragmentary view of a part of the mechanism illustrated in Figure 2, as when the governor is expanded.

Figure 1:
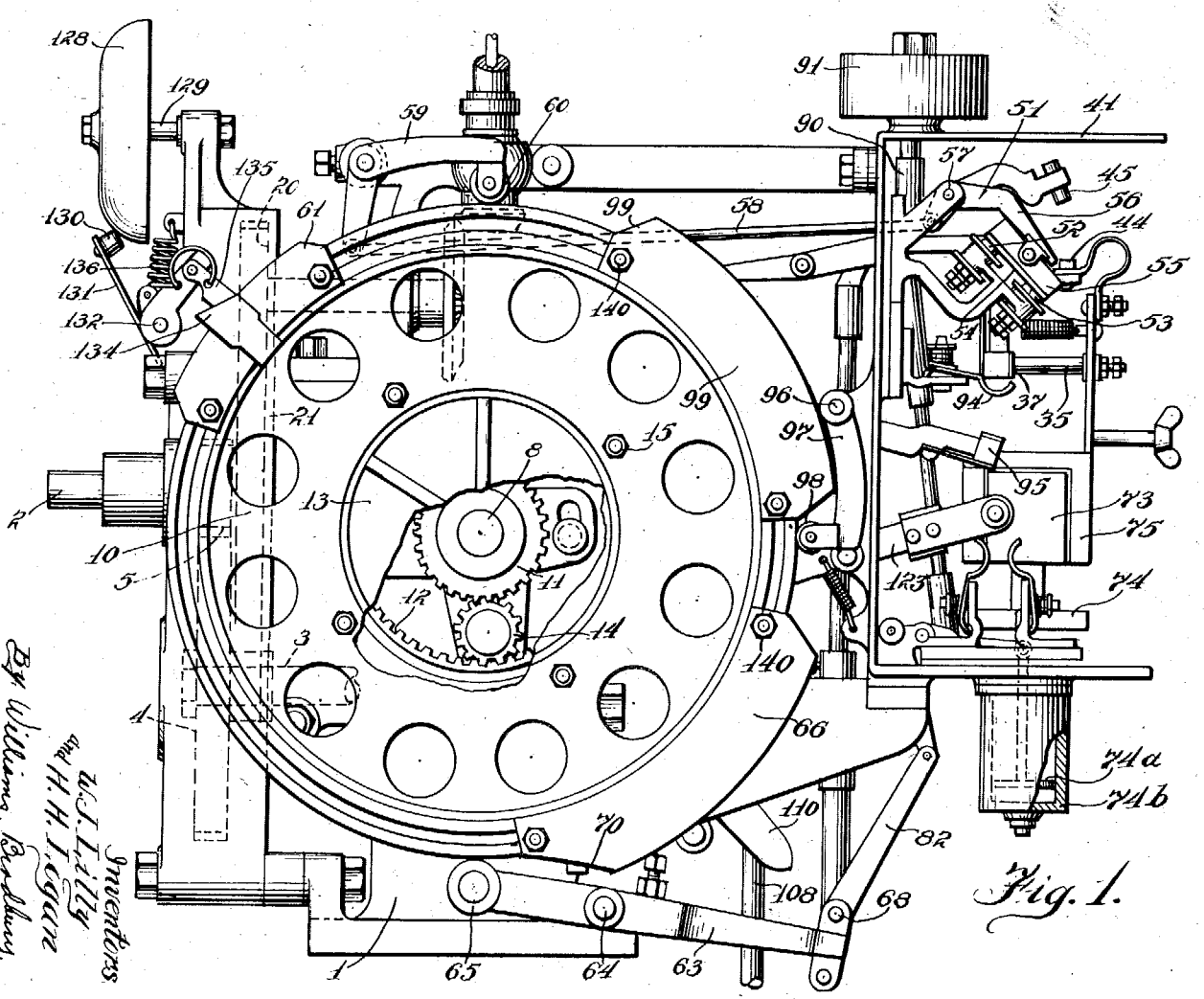

Figure 8 is an end elevation of a brake actuating mechanism, operated by our improved controlling device, Figure 9 is a side elevation of the mechanism illustrated in Figure 8, with a part added thereto, Figure 10 is a side elevation of the mechanism for controlling the speed of the actuation of the brake actuating mechanism, and Figure 11 is a view of a modified form of a part of the mechanism of Figure 10.

In carrying out our invention we make use of a frame 1, forming a stand upon which the various instrumentalities of our controller are mounted. Ordinarily our controlling mechanism is fixed with the base 1 upon a pedestal so that the controlling mechanism is sufficiently clear of the floor so as to enable the engineer to have access to the various parts thereof readily, and so that the presence of obstructions on the floor may not hinder proper functioning of the mechanism.

A shaft 2 is rotatably mounted upon the frame 1 and is arranged for connection by some positive driving mechanism with a hoist drum for which the controller is provided. Ordinarily gears disposed upon the shaft 2 and upon an adjacent counter shaft which is connected with the drum form adequate positive connection although sprocket and chain mechanism as well as the use of bevel gears and drive shafts are efficient. A second shaft 3 is rotatably mounted in parallel relation with the shaft 2, and a gear 4 is carried by the shaft 3, which is in mesh with a gear 5 carried by the shaft 2. The gears 4 and 5 form reduction gears, whereby the rotation of the shaft 3 will be slower than the shaft 2. A worm 6 is carried by the shaft 3 and is in mesh with a worm gear 7, carried by a shaft 8, disposed transversely to the shaft 3. A pair of cam supporting dials 9 and 10 is rotatably mounted upon the shaft 8, one on each side of the base portion 1, and of the worm gear 7. Assuming that there are two ropes used on the hoisting drum, one rope winding on one end as the other rope unwinds from the opposite end, then one dial will protect the approach of rope #1 at the top, and the rope #2 at the bottom, while the other dial will protect the approach of rope #2 at the top and rope #1 at the bottom.

Figure 4:
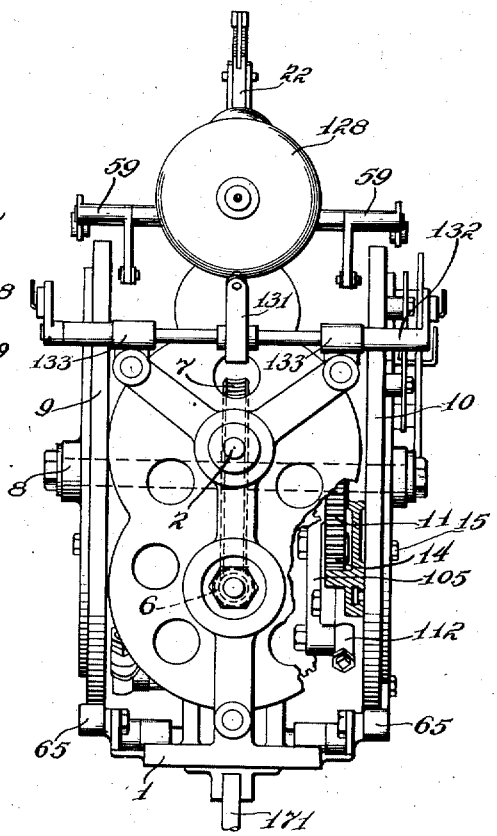
Figure 4 is an end elevation of the mechanism illustrated in Figure 1 on a reduced scale.

Driving engagement between the shaft 8 and the dials 9 and 10 is provided in two gears 11 keyed to the shaft 8, and internal gears 12 forming a part of spiders 13 upon which the dials 9 and 10 are mounted, and pinions 14 in mesh with the gears 11 and with the internal gears 12. In Figure 4 of the drawing, each of the spiders 13 may be seen, the spider associated with the dial 10 being partially in section to expose the gear 11 associated therewith, and the pin 14 as well as the internal gear portion 12, which latter members may also be seen in Figure 1. Inasmuch as the gear 11, the pin 14, the spiders 13 and the internal gear portion 12 associated with the dial 9 are identical in structure to that associated with the dial 10, these members have not been shown in section in Figure 4 for the purpose of simplicity. This gear train as in the case of a gear train 6—4—5 is a reduction gear train, so that the ultimate movement of the dials 9 and 10 is relatively slow as compared to the rotation of the shaft 2.

The dials 9 and 10 are fixed to their respective spiders 13 by means of four binding bolts 15 which when loosened permit the advancing or retarding of the dials 9 and 10 upon their respective spiders 13. This structure is for the purpose of adjusting the mechanism for variations which may occur in the length of the cables, that is, the cables used for supporting the skip or cage in the shaft, particularly in the installation of a deep mine hoist.

A governor for operating the speed actuating mechanism of our improved controller is carried by a vertically extending tubular shaft 16 rotatably supported at the upper end of the frame 1.

A bevel gear 17 is carried at the lower end of the shaft 16 and is in mesh with a bevel gear 18 disposed upon one end of a horizontally mounted shaft 19. The shaft 19 is provided with a gear 20 at its outer end which gear is in mesh with a gear 21 carried by the shaft 2, so that the governor which is shown at 22 may be directly connected with the shaft 2, and thence with the hoisting drum. A push rod 23 arranged to be moved downwardly as the fly balls 24 of the governor are elevated, has disposed adjacent the lowermost end thereof a collar 25. A bifurcated lever 26 pivotally mounted at 27 of the frame 1, has its bifurcated portion in engagement with the under side of the collar 25, whereby downward movement of the push rod 23 will occasion a rocking of the lever 26 upon its support 27.

An adjustable weight 28 connected with the lever 26 through a connecting link and an arm 30 is provided for opposing the elevation of the outer end 31 of the lever 26, and then the elevation of the fly balls 24.

A dashpot 32 having its piston 33 connected to the lever 26 by means of a pitman 34 is provided for maintaining steady movement of the lever 26 and thereby preventing unintentional fluctuations of the lever.

An over-speed switch arranged for operation by the governor 22 is provided and consists in a pair of stationary switch members 35 mounted upon an insulating panel 36 (see Figure 2). It should be noted that while but one of the switch members 35 is visible in the side elevation shown in Figure 2, the relative positions of these switch members 35 is clearly shown in Figure 5. A switch member 37 carried by an insulating block 38 and arranged to be moved into engagement with the switch members 35 so as to form an electrical connection between the members 35 is mounted upon an L-shaped switch lever 39, pivotally supported at 40 within a switch housing, part of which is shown at 41, and which is supported upon the frame 1. A tension spring 42 is provided for the purpose of normally holding the lever 39 in such a position as to cause the switch member 37 to engage and contact with the switch members 35. This switch 35—37—35 we shall hereinafter refer to as the over-speed switch, and is one of three switches employed for the purpose of stopping the hoisting engine and applying the brake mechanism to the hoist drum if the hoist drum exceeds the speed for which the controller is set, or if the hoist drum permits the cable to move beyond either of its normal limits of travel, the latter two switches being for the purpose of preventing over travel of the skip or cage. These three sets of switches, one of which has just been described, are preferably connected in series in the circuit for controlling the hoisting engine.

An over-speed alarm switch for the purpose of closing a circuit in which an electric bell is a part, for advising the engineer that the speed of the hoist drum is approaching a speed inconsistent with safety, is provided in a contact member 43 carried by the substantially horizontal portion 44 of the L-shaped member 39. A contact member 45, carried by a lever 46, in registration with the contact member 43, is provided for completing the over-speed alarm switch. The lever 46 has its fulcrum at 88. This fulcrum 88 is floating in nature, and the particular construction thereof will be hereinafter described. The rearward end of the lever 46 is connected at 47 to an intermediate point of a floating lever 48, one end of which connects with a link 49, the opposite end of the link 49 being pivotally connected at 50 to the forward end 31 of the lever 26 at that point where the pitman 34 engages the lever 26. From inspection of Figures 2 and 3 it will be seen that downward movement of the push rod 23 as by expansion of the governor 22, will place the levers 26 and 46 in the position shown in Figure 3, assuming for the moment that the point 69 is stationary, thereupon causing the contact member 45 to engage with the contact member 43, and close the circuit therebetween and also to force the lever 39 in such a position to disengage the switch member 37 from the switch members 35, thereby opening the over-speed switch 35—37—35. This is precisely what occurs when the speed of the hoist drum exceeds the speed consistent with safety, and is determinable by adjustment of the various instrumentalities of the governor, including the adjustment of the weight 28.

In order that the over-speed alarm bell heretofore mentioned may operate before the over-speed switch 35—37—35 opens, so as to permit the engineer to have time to manually actuate the hoist control so as to lessen the speed, we have constructed the contact member 45 so that it may slide upon its axis for a distance of substantially one-thirty-second to one-sixty-fourth of an inch, and have provided a spring 51[a] for normally holding the contact member 45 at that end of its axial travel adjacent to the contact member 43. The strength of the spring 51[a] must necessarily be less than the force exerted by the spring 42, so that when the lever 46 is moved downwardly into the position shown in Figure 3, the contact members 43 and 45 will first engage, thereby causing the over-speed alarm bell to ring. Further movement of the lever 46 will not cause an immediate movement of the lever 39, since the spring 51[a] will give, permitting the movement of the contact member 45 to the opposite end of its axial travel before movement of the lever 46 is imparted to the lever 39.

Figure 5:
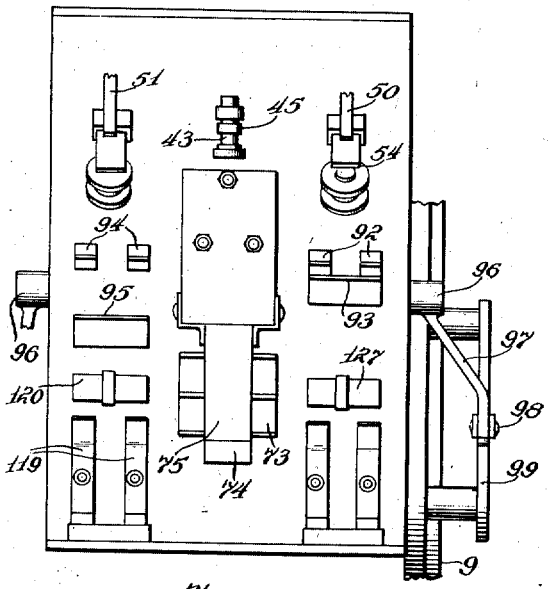
Figure 5 is a fragmentary front elevation of the mechanism illustrated in Figure 1.

Means for shutting off the hoisting engine and applying the brake mechanism when the skip or cage has reached its end of travel regardless of the speed at which the skip or cage is traveling is provided in a pair of final stop switches generally indicated at 50 and 51, (see Figure 5). In Figure 1 the switch mechanism 51 is more clearly shown. These switches are identical in construction and consist in a pair of stationary contact members 52 and 53 mounted within the switch housing, part of which is indicated at 41. Switch members 54 for electrically connecting the contact members 52 and 53 are carried by an insulating block 55, pivotally mounted on L-shaped levers 56 within the switch housing. These levers 56 are pivotally supported at 57, and are connected by means of connecting rods 58 to cam bell cranks 59 having rollers 60 at the outermost end of their longer arms. These rollers 60 are arranged to engage with final switch cams 61 carried by the adjacent dials 9 and 10. In Figure 4 we have shown the cams in proper relation on the right-hand side of the machine, but for the sake of simplicity, the cams have been omitted from the left dial or dial 9. When the cam 61 engages with the roller 60, the crank arm 59 will be raised, thereby raising the lever 56 and causing the switch member 54 to move out of engagement with the contact members 52 and 53, thereby opening the switch, which will perform the same function as the opening of the switch 35—37—35. Means for compelling reduction in speed of the hoist drum as the skip or cage approaches its ends of travel is provided in a retarding mechanism associated with the switch 35—37—35. By compelling reduction in the speed, we mean that if the engineer fails to reduce the speed of the hoist drum as the skip or cage approaches its end of travel that the hoist engine will be shut off and the brakes applied through the opening of the switch 35—37—35. If the engineer does heed an audible signal, the nature of which will be hereinafter described, and reduces the speed at the end of travel, then the retardation mechanism will follow the engineer's movements until the final stop has been brought about. This retardation mechanism consists in a bifurcated retardation lever 63, pivotally supported upon the frame 1 and having rollers 65 upon each of the bifurcated portions thereof. The rollers 65 are in registration with the peripheral edges of the dials 9 and 10, so that retardation cams 66 carried by the dials 9 and 10 may engage with the rollers 65 as the dials are moved, and occasion the pivotal movement of the lever 63 upon their axis 64. As the lever 63 is actuated, as by means of the cam 66, it will assume the position shown in dotted lines in Figure 2. A push rod 67 is pivotally connected at 68 to the lever 63 and at its uppermost end at 69, to one end of the floating lever 48 so that elevation of the push rod 67 to the position shown in dotted lines will occasion a downward movement of the lever 46, (see dotted lines in Figure 2). It is apparent that when the push rod 67 is in the position shown in dotted lines in Figure 2 that the less expansion of the governor 22 is required than normally, to open the switch 35—37—35; therefore our improved control compels a reduction in the speed of the hoist drum at its ends of travel.

It will be noted from inspection of Figure 1 that the retardation cam 66 has an inclined approach 70 so that initial movement of the lever 63 is gradual.

We have heretofore shown that our improved controller compels reduction in the speed of the hoist drum as the skip or cage approaches the ends of travel. This precautionary feature is one of the utmost importance, and must be employed in the successful operation of the hoist within the limits of safety. It is sometimes necessary and essential to efficient operation, however, that the skip or cage may move away from its limits of travel when adjacent to that limit unretarded by the retardation mechanism described. This is particularly important where ore or coal is to be hoisted and the day's output of work dependent entirely upon the speed at which the hoist is to be operated.

Mechanism for permitting the movement of the skip or cage away from its ends of travel at normal or full speed, yet effectively preventing movement of the skip or cage toward its end of travel, except at normal speed is embodied in an acceleration circuit including a solenoid 73 mounted within the switch housing and having a core 74 which may be moved into engagement with the open body 75 of the solenoid, (see Figure 2) or which may drop to a position below the solenoid 73 as shown in Figure 1 when the solenoid is deenergized. The movable core 74 of the solenoid is provided with a plunger $74^a$ and a dashpot $74^b$ for the purpose of maintaining a steady movement in the descent or ascent of the solenoid core. A lever 80 is pivotally mounted at 81 at a short distance from the body 74 of the solenoid 73. This lever 80 is pivotally connected by a link 82 to the pivotal connection 68 of the push rod 67 and the retardation lever 63. A link 83 and a floating lever 84 pivotally connected with one another form a mechanical connection between the core 74 and the lever 80. It will be noted that the lever 80 is formed in the shape of a bell crank and that the portion 85 thereof, to which the link 84 is connected, is the shorter arm of the bell crank.

A push rod 86 is supported at its lower end upon the link 84 adjacent to its connection with the bell crank lever 80. The upper end of the push rod 86 is disposed in a socket 87 which is attached at 88 to the lever 46 intermediate the length of this lever. A link 89 is employed for connecting the fixed shaft 40 upon which the switch lever 39 is mounted with the pivotal connection 88.

The purpose of the link 89 is to provide a pivotal mounting for the entire assembly, consisting of the member 46 and the members 48, 49 and 31, which are lifted by movement of the rod 68 upwardly upon actuation of the cam lever 63, and also to permit movement of this assembly when the solenoid core drops and permits the rod 86 to fall. The switch 37—38 is actuated, i. e., opened, upon engagement of the contact member 45 with the member 43 when the spring 51ª has yielded so as to cause the member 39 to move upon its pivotal support 40 against the action of the spring 42 so as to carry the member 38 out of engagement with the members 37.

A stem 90 is arranged to extend upwardly from the pivotal connection 88 and to a point exteriorly of the switch casing. This stem 90 carries an adjustable weight 91 thereupon for the purpose of bearing down upon the lever 46 so as to assure a firm contact of the contact members 43 and 45 of the over-speed alarm switch heretofore described.

When the core 74 of the solenoid 73 is elevated to the position shown in full lines of Figure 2, the push rod 86 will likewise be elevated so as to cause the lever 46 to rise slightly at the portion embodying a pivotal connection 88, thereby raising the fulcrum of the lever 46 and making it necessary to move the lever 46 a greater distance in order to cause contact of the over-speed alarm contact members 43 and 45.

When the core 74 is in the position shown in dotted lines, which is the normal position of the core, the fulcrum 88 of the lever 46 is in its normal position, and engagement of the over-speed alarm switch contact member will be effected by a lesser movement of the lever 46.

It is well to note at the present time that the purpose of an accelerating solenoid 73 and its association with the lever 46 is merely to overcome the effect of the operation of the retardation mechanism when the cage or skip is moved in a reverse direction. An inspection of Figure 2 will show that when the retardation lever 63 assumes the position shown in dotted lines, as by virtue of the retardation cam 66 engaging therewith, that the link 82 will cause elevation of the bell crank lever 80 so as to slightly raise the pivotal connection between the link 84 and the bell crank 80. While the mechanism is in this position, the elevation of the core 74 to the position shown in full lines will cause a considerable change in an upward direction of the fulcrum 88 of the lever 46.

Figure 7:
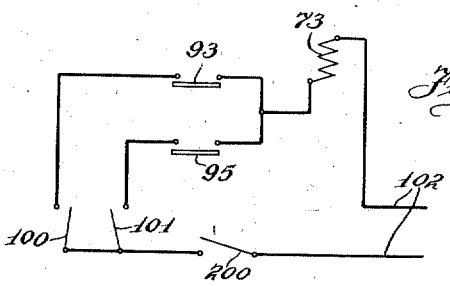
Figure 7 is a diagrammatic view of an electrical circuit employed for the acceleration mechanism.

The circuit employed for operating the solenoid 73 in conjunction with the accelerating mechanism involves a pair of switches 92, 93, 92, 94, 95, 94, mounted within the switch housing, 1 in registration with each of the dials 9 and 10. The movable elements 93—95 of the switches are pivotally mounted upon axes 96 and are each provided with a radially extending arm 97 bearing a roller 98 at the outermost end thereof, which roller is in registration with an accelerating cam 99 carried upon the dial associated with the switch of which the adjacent arm 97 is a part. In Figure 1 we have shown the cam 99 just about to engage with the roller 98 of the switch 94—95—94. Engagement of the cam 99 with the roller 98 will cause the movable switch element 95 to be elevated and engaged with the switch members 94 so as to close that switch. In Figure 7 the circuit embodying this accelerating mechanism includes a solenoid 73, the accelerating switches herein described, and a pair of switches 100 and 101. These switches 100 and 101 are arranged by any suitable mechanical means in such a manner as to alternately open and close when the reverse lever at the engineer's platform is actuated, i. e., when the hoisting engine is driving the hoist drum in one direction, one of the switches is closed, the opposite switch being closed when the hoist drum is being driven in the opposite direction, the remaining switch at all times being open, so that actuation of the accelerating switch associated with the closed switch 101 or 100 may not occasion energization of the solenoid 75 by virtue of the electric current from the service line 102, and affect the controlling mechanism in the manner heretofore set forth.

Means for maintaining a speed consistent with the safety of men is provided in mechanism forming a part of our controller which we choose to call the man-safety mechanism. This mechanism performs two important functions, first, that of effecting a change in the position of the dials 9 and 10 and their drive shaft 8 so that the skip or cage may be brought to a stop at the man landing, which is below the rock landing, and which will so affect the governor control over-speed switch 35—37—35 as to cause that switch to open at a lower speed of the hoist drum than when the device is in use for the control of the skip or cage when men are not riding, so that the speed of the skip may not rise above that degree safe for the handling of men. This mechanism consists in a lever 105 upon which the pinion 14 is mounted. This lever 105 is pivotally mounted concentric with the shaft 8, which carries the gears 11. There is one lever 105 for each dial 9 and 10. Slotted portions 106 of the lever 105 through which stop pins 107 are projected serve as a means for limiting the movement of the lever 105 upon its axis 8. It will be manifest that any oscillatory movement of the lever 105 upon its pivotal support will occasion an advance or retreat of the dials 9 or 10 associated therewith, relative to the shaft. In this manner, the change in relation between the dials 9 and 10 and the shaft 8 sufficient to cause the mechanism to actuate at different ends of travel is established. In Figure 2 we have shown the lever 105 in a position to stop at its uppermost end of travel, i. e., the rock landing. The man-safety mechanism is not effective in Figure 2.

Figure 6:
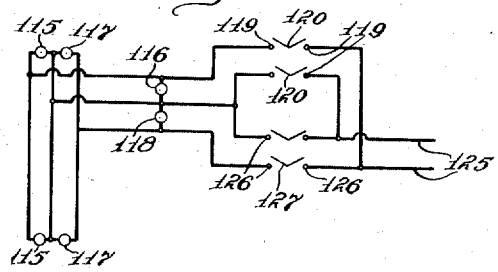
Figure 6 is a diagrammatic view showing the electrical circuit employed for the man-safety mechanism.

Means for actuating this mechanism consists in a control rod 108, one for each of the levers 105, which are arranged for actuation by the engineer. These rods 108 are pivotally connected at 109 to a cam 110 which is in turn pivotally supported at 111 upon the frame 1. The cam 110 is connected by a link 112 to the lever 105 so that elevation of the connecting rod 108 and consequently elevation of the cam 110 will occasion the advance of the dial 9 or 10 associated with the lever 105. When the cam 110 is elevated it will engage with one fork of a bifurcated member 113, thereby elevating the push rod 67 in precisely the same manner as when the retardation cam 63 is in operation, but to a slighter degree. This elevation of the push rod 67 will so alter the mechanical connection of the governor 22 and the over-speed stop switch 35—37—35 that the switch will open when the hoist drum is traveling at a lesser speed than is normally attained for raising rock. In Figure 6 is shown an electrical signal system which is used in conjunction with the main safety mechanism. This system embodies incandescent lamps 115 at the top and bottom of the mine shaft, and a lamp 116 in the engineer's room for the protection of the cage carried by one rope, and lamps 117 at the top and bottom of the shaft, and a lamp 118 in the engineer's room for the cage carried by the other rope. Electric switches for actuating the lamps in this signal circuit consist of four stationary switch members 119 and a pair of movable switch members 120 associated with one of the cams 110 by means of a link 121 having a floating connection at 122 with a pivotally mounted switch lever 123 upon which the movable switch members 120 are supported. When the lever 105 associated with the dial 10 is actuated by its associate member 110 being elevated, then the movable switch members 120 are lowered into engagement with the stationary switch members 119, energizing the lamps 115 and 116 by virtue of a current source 125.

A switch identical in construction with the switch 119—120—119 is disposed on the opposite side of the switch casing and consists in stationary members 126 and movable members 127, arranged to actuate when the lever 105, associated with the dial 9, is actuated. This switch is for the purpose of energizing the lamps 117 and 118 by virtue of the current source 125 so that miners and the engineer may be visibly informed that the man safety equipment is in operation and effective for the cages carried by one rope.

The mechanism for giving audible warning to the engineer that the skip or cage is approaching either of its ends of travel, and which actuates just prior to the engagement of the retardation cam 66 with its associate roller 65 is provided in a bell 128 supported at 129 upon the frame 1 of the device. The bell 128 has a clapper 130 carried upon a spring arm 131 which is arranged to extend radially from a shaft 132. This shaft 132 is rotatably supported in bearings 133 and overlies the peripheral edge of each of the dials 9 and 10.

The dials 9 and 10 are each provided with an alarm cam 134 which cam is arranged to engage with a cam 135 supported upon the shaft 132 in such a manner as to cause rotation of the shaft 132 and movement of the clapper 130 away from the bell 128 against the force of the tension spring 136. When the cam 134 moves out of engagement with the cam 135, the spring 136 will cause quick movement of the shaft 132 and consequently the clapper 130 to its original position, thereby striking the bell 128 and giving audible notice to the engineer that the skip or cage is approaching its end of travel, whereupon the engineer may actuate the hoisting engine to reduce the speed of the engine and to ultimately apply the brakes, when the hoisting engine has been shut off.

As heretofore stated, the engineeer may so actuate the hoisting engine and the brake mechanism as to relieve the safety device of its mechanical functions. It is intended that this shall be the case as our controlling mechanism is for the purpose of doing what the engineer may through inadvertence or disability fail to do, and are therefore for purpose of averting serious accidents, and damage to both property and life, which occurrences are not altogether uncommon in the art where ordinary control mechanism is employed.

In Figures 8, 9 and 10 we have shown one embodiment of a brake actuating mechanism which may be used with our improved hoisting engine control. This is shown for the purpose of thoroughly establishing the relation of the various instrumentalities of the controller with a brake actuating mechanism. A shaft 150 is supported upon a bearing member 151, and carries an arm 152 radially extending therefrom, upon which a heavy weight 153 is fixed. A relatively short arm 154, also carried by the shaft 150, is arranged for connection by any mechanical means, such as a connecting rod, to the throttle mechanism of the hoist engine. This may be the ordinary type of throttle or any well known control mechanism actuated by the longitudinal movement of such a connecting member as the connecting rod 155, which will move when the weight 153 is permitted to fall.

Means for normally locking the weight 153 in an elevated position (see Figure 8) consists in a pair of magnet coils 156, carried by the support 151. An armature 157 is provided at one end of a lever 158 which in turn is pivotally mounted to a projection 159 of the support 151. A latch member 160, which is arranged to engage with the weight 153 at 161 is pivotally mounted at 162 upon the member 151. This latch member 160 is connected by means of a link 163 to a lever 164 which in turn is connected by means of a link 165 to the lever 158.

As long as the magnet coils 156 are energized, the latch member 160 will lock the member 153 against descent by virtue of its weight, but when the magnet coils 156 are deenergized, the member 157 will be free to move away therefrom, which will permit the latch member 160 to be moved upon its pivotal support 162, and thereupon permit the weight 153 to drop and operate the throttle mechanism heretofore described, to shut off the hoist engine.

The magnet coils 156 are disposed in that circuit which has been heretofore described and which includes the final stop switches 50 and 51 and the over-speed switch 35—37—35. If either of these switches is open, the magnet coils 156 will be de-energized, thus causing the throttle closing mechanism to be applied. The hoisting engine will then be shut off.

The mechanism heretofore referred to for gradually applying the brakes or suddenly applying the brakes, depending upon the position of the skip or cage in the mine shaft, and directly dependent upon the engagement of the retardation cams 66 with their associated rollers 65 is provided in an anvil 167 having a wedge-shaped member 168 slidably mounted thereupon. A bell crank 169 is connected at one end with the member 168 and at the opposite end 170 to a link 171, the upper end of which is pivotally connected to the retardation lever 63. This arrangement interposes the thinnest part of the wedge-shaped lever 168 between the anvil 167 and an adjustable striker 172 carried by an arm 173 which is loose on the shaft 150 when one of the retardation cams 66 is in full engagement with its associate roller 65, thereby limiting the downward movement of the arm 173. When the retardation cams 66 are not in engagement with the rollers 65, the thickest portion of the wedge-shaped member 168 is interposed between the stop striker 172 and the anvil 167. In this manner, the full movement of the weight 153 may be exerted upon the braking mechanism when the skip or cage is close to its end of travel and thereby apply the brakes quickly. When the skip or cage is at points intermediate its ends of travel and not close to either of the limit landings, the brake mechanism will be applied gradually.

In Figure 11 we have shown the modified form of the graduated stop member 168. This form is connected directly with the connecting link 171 and has an arcuate surface 175 upon which the striker 172 must fall. The graduated stop member is generally indicated at 176.

A link 177, connected at 178 to the arm 173, has a floating connection at 179 with a valve control lever 180, which is employed for the purpose of operating the brake engine. It will be noted that by an actuation of the throttle mechanism the brake engine is actuated. This valve control arm 180 is also connected by a link 181 to a suitable control disposed at the engineer's platform, so that the engineer may manually control the brake engine regardless of the fact that the weight 153 is elevated. If the weight 153, however, is lowered, the engineer may not again release the brake mechanism until the weight 153 has been elevated.

From the foregoing description of the various parts of the device, the operation thereof may be readily understood. Let us assume that our improved safety control device for hoisting engines has been properly installed and that the cams 61—66, 99, and 134 are properly adjusted upon their respective dials 9 and 10. This is done by moving the cams along the periphery of the dials and tightening the adjusting bolts 140 which also serve to secure the cams to the dials 9 and 10. Let us assume that the man-safety levers 105 are in the position shown in Figure 2, and therefore the control is adjusted for use at its greatest speed, i. e., rock speed. The skip or cage, according to the illustration in Figure 1 is just approaching its upper limit of travel. Continued movement of the hoisting drum will occasion further movement of the dial 10 in a clockwise direction, thereby causing the cam 134 to actuate the bell clapper 130 in the manner heretofore described. The engineer at this time will have knowledge that the skip or cage is approaching its upper end of travel.

If the engineer properly manages the hoisting engine and the brake mechanism to reduce the speed of the hoisting drum, and to finally apply the brakes, our improved safety device will not perform any of its functions, but will at all times, stand ready to perform any of the steps in the operation of the hoisting drum and engine that the engineer fails to perform. Let us assume that the engineer does not heed the audible warning and for some unforeseen reason fails to operate his control mechanism. As the hoist drum continues to rotate, the retardation cam 66 will engage with its adjacent roller 65, causing an elevation of the push rod 67. This elevation of the push rod 67 will be gradual, and if the speed of the hoist drum is not reduced, the lever 46 will move so that the contact members 43 and 45 touch, thereby giving an audible alarm that the speed of the hoist drum is too great for safety at the limits of travel, and finally the switch 35—37—35 will be opened. Instantly upon the opening of this switch the magnet coils 156 will be de-energized and the member 153 will drop, rotating the shaft 150, which will cause movement of the connecting rod 155 to cut off the power, and at the same time allowing the arm 173 to drop to the stop 168, thereby actuating the valve arm 180 by means of the rod 177, and causing the brake engine to set the brakes. The application of the brakes at this time will be relatively quick, since the retardation cam 66 has caused the wedge-shaped stop member 168 to be moved with its thinnest portion interposed between the anvil 167 and the adjustable striker 172.

Let us assume now that the speed of the hoisting drum is not sufficient to cause the over-speed switch 35—37—35 to open. In this event, the final stop cam 61 is engaged with the roller 60, supported upon the arm 59, and will cause the limit or final stop switch 51 to be opened. This switch 51 will also cause de-energization of the magnet coils 156 and the hoisting engine, as well as the brakes, would be actuated to bring the cage or skip to a stop.

Let us now assume that the engineer is in full control of the hoisting engine and the brake mechanism, and that the skip or cage is at its uppermost limit of travel. It is highly desirable that sufficient speed be maintained in lowering the skip or cage for another load, and since no harm may come to the machinery by a rapid movement of the skip or cage in a direction away from the end of travel, the acceleration mechanism and circuit heretofore described must be operated. This is done, as reference to Figure 7 will show, by closing one of the switches 100 or 101. These switches close when the engineer manually operates the lever which controls the direction of rotation of the hoisting drum. Let us assume that the operation of this lever has been accomplished and that one of the switches 100 or 101 has been closed, i. e., that switch which is in series with the switch 94—95—94. A switch 200 is provided, and is so arranged that it will close when the throttle is opened a fractional amount, and will remain closed as long as the throttle is open that amount or more, but will open as soon as the throttle is closed any amount beyond the point at which the switch closes. If it were not for this switch, should the engineer throw the reverse to the opposite direction from that in which the drum is revolving, when nearing the end of travel, as he very often does, the accelerating mechanism would function while approaching the end of travel, instead of when going away, with the result that the allowable speed would be too great for safety. Since the circuit must pass through the switch 200 before being completed, it follows that if this switch is open the accelerating mechanism will not function. This means that if the reverse is thrown against the motion of the drum, and the throttle is opened sufficiently to cause the accelerating feature to function, steam will also be applied against the rotation of the hoist, and the safety device will not be called upon to function, as the power of the hoist will be applied to stop rotation. If that power is not so applied, the controller will function as intended, regardless of the position of the reverse lever. This will cause the energizing of the solenoid 73 and the elevation of the core 74. As the core 74 is elevated, the push rod 86 will be elevated and so raise the fulcrum 88 of the lever 46 as to counteract the tendency of the retardation lever 63, which is at this time in full engagement with the cam 66, to permit the skip or cage to travel away from the end of travel at sufficient speed. When the skip or cage has traveled a sufficient distance to cause the retardation cam 66 to be moved out of engagement with the roller 65, the acceleration cam 99 will have moved out of engagement with the roller 98 associated with the acceleration switch 94—95—94. The control mechanism will now assume its normal condition.

Let us assume that the skip or cage is between its limits of travel, but that for some reason the speed of the hoisting drum is greater than consistent with safety. If this be true, actuation of the governor 22 will occasion movement of the lever 46 so as to cause the alarm contact members 43 and 45 to touch and give audible alarm that the hoisting mechanism is traveling at an excessive or dangerous speed. If the engineer does not instantly correct this condition, and an increase of speed is attained, the switch lever 39 will move upon its pivotal support 40 so as to open the over-speed switch 35—37—35, which will de-energize the magnet coils 156, and therefore cause the brake mechanism to be applied and the power for the hoisting mechanism to be shut off.

Let us assume now that it is desirous to carry men in the cage or skip and that a speed consistent with the safety of men must be maintained. The engineer is in possession of two control members 108 for actuating the man safety mechanism. These control rods 108 are associated with two levers 105, one for the dial 9, and one for the dial 10. The member 108 which is to be actuated depends upon which cage the men are to travel in. Let us assume that men are to ride on the cage whose upward limits of travel are controlled by dial 10 and in the present instance that they are being hoisted.

It does not matter whether the men are being hoisted or lowered, as far as the setting of the device is concerned, as the man-safety feature simply limits the movement upward and downward, as well as the speed. Should the engineer start in the wrong direction when attempting to lower men, or fail to stop at the proper point to discharge men when they are being hoisted, the device must function in precisely the same manner. In this event, the member 108, (see Figure 2) should be elevated, thereby closing the switch 119—120—119. This will operate the lamps 115 and 116 so that the men at the top and bottom of the shaft, as well as the engineer may know that the man-safety mechanism for the cage in which men are riding is in operation. As the member 108 is elevated, the lever 105 will move in a clockwise direction. (See Fig. 2), thereby causing the dial 10 to advance upon its axis 8 so that the cams mounted upon the dial will become effective at a point below the final limit of travel, i. e., the man landing. Simultaneously with the elevation of the member 108, the cam member 110 will engage with the bifurcated member 113 on the push rod 67 and elevate one end of the floating lever 48, thereby raising the operative engaging point 47 of the lever 46. This position of the various elements will cause the closing of the alarm contact members 43 and 45 at a relatively lower speed of the hoisting drum than that speed normally maintained for rock. Consequently, the overspeed switch 35—37—35 will operate at a lower speed than that speed employed for hoisting rock.

We claim:

1. A hoisting engine controller of the type described comprising a shaft arranged for synchronism with the hoist drum of a mine hoist, a dial carried by said shaft, cams carried by said dial adjacent the peripheral edge thereof, a rock arm, a roller carried by said rock arm and arranged to be engaged by said cams, and a switch actuated by the rock arm, said dial being arranged for adjustment on the shaft, whereby said switch may be actuated at various angular positions of the shaft.

2. A hoisting engine controller of the type employed for controlling a brake engine having an electrical controlling circuit which is used in connection with a hoisting engine, comprising a shaft arranged for synchronism with the hoist drum of the hoist engine, a spider carried by said shaft, a dial rotatably supported concentric with said spider, cams carried by said dial adjacent the peripheral edge thereof, a cam-actuated switch arranged for actuation by said cams, and means for fixing said dial against rotation on said spider at will whereby the relative position of the spider on said dial may be varied.

3. A hoisting engine controller of the character described comprising a dial having a cam thereupon, a cam operated electric switch arranged for operation by the cam on said dial when said dial is rotated, a shaft, arranged for synchronism with the hoist drum of a mine hoist, and adjustable means associated with said shaft and with said dial for adjustably mounting said dial on said shaft in such a manner as to permit the advancement or retardation of said dial upon the shaft.

4. A hoisting engine controller of the character described comprising a dial having a cam thereupon, a cam operated electric switch arranged for operation by the cam on said dial when said dial is rotated, a shaft arranged for synchronism with the hoist drum of a mine hoist, and adjustable means associated with said shaft and with said dial for adjustably mounting said dial on said shaft in such a manner as to permit the advancement or retardation of said dial upon the shaft, said means comprising a gear carried by said shaft, a spider mounted concentric with said shaft, and having an internal gear, a pinion in mesh with said internal gear, and with said gear on said shaft.

5. A hoisting engine controller of the character described comprising a dial having a cam thereupon, a cam operated electric switch arranged for operation by the cam on said dial when said dial is rotated, a shaft, arranged for synchronism with the hoist drum of a mine hoist, and adjustable means associated with said shaft and with said dial for adjustably mounting said dial on said shaft in such a manner as to permit the advancement or retardation of said dial upon the shaft, and other means associated with said first named means and manually actuated for effecting the advancement or retardation of said dial relative to said shaft at will and from a point remote from said controller.

6. A hoisting engine controller of the character described comprising a cam operated limit switch and an overspeed switch, a governor for operating said over-speed switch, a shaft arranged for synchronism with the hoist drum of a mine hoist, said shaft being connected by means of a gear train with said governor, a movable cam supporting member, a cam carried by said member arranged to actuate said cam operated switch when moved into engagement therewith, means associated with said shaft and with said movable cam supporting member for moving said cam supporting member at a speed directly proportional to the speed of said shaft and consequently said hoist drum, and other means associated with said first named means for varying at will the relative position of said movable member and said shaft, thereby to hasten or retard the engagement of said cam with said cam operated switch.

7. A hoisting engine controller of the character described comprising a cam operated limit switch and an overspeed switch, a governor for operating said over-speed switch, a shaft arranged for synchronism with the hoist drum of a mine hoist, said shaft being connected by means of a gear train with said governor, a dial concentric with said shaft, a cam carried by said member arranged to actuate said cam operated switch when moved into engagement therewith, means associated with said shaft and with said movable cam supporting member for moving said cam supporting member at a speed directly proportional to the speed of said shaft and consequently said hoist drum, and other means associated with said first named means for varying at will the relative position of said movable member and said shaft, thereby to hasten or retard the engagement of said cam with said cam operated switch.

8. A hoisting engine controller of the character described comprising a cam operated limit switch and an over-speed switch, a governor for operating said over-speed switch, a shaft arranged for synchronism with the hoist drum of a mine hoist, a gear train connecting said shaft with said governor, a movable cam supporting member, a cam carried by said member arranged to actuate said cam operated switch when moved into engagement therewith, means associated with said shaft and with said movable cam supporting member for moving said cam supporting member at a speed directly proportional to the speed of said shaft and consequently said hoist drum, other means associated with said first named means for varying at will the relative position of said movable member and said shaft, thereby to hasten or retard the engagement of said cam with said cam operated switch, a retardation cam carried by said cam supporting member, and a cam operated means arranged for actuation by said retardation cam as said cam supporting member is moved, and associated with said governor and said over-speed switch for changing the relative positions of the switch members of said over-speed switch, whereby said over-speed switch may be actuated with a relatively less expansion of said governor than normal.

9. A hoisting engine controller of the character described, comprising a cam operated limit switch and an over-speed switch, a governor for operating said over-speed switch, a shaft arranged for synchronism with the hoist drum of a mine hoist, a gear train connecting said shaft with said governor, a cam supporting dial mounted concentric with said shaft, a cam carried by said member arranged to actuate said cam operated switch when moved into engagement therewith, means associated with said shaft and with said movable cam supporting member for moving said cam supporting member at a speed directly proportional to the speed of said shaft and consequently said hoist drum, other means associated with said first named means for varying at will the relative position of said movable member and said shaft, thereby to hasten or retard the engagement of said cam with said cam operated switch, a retardation cam carried by said cam supporting member, and a cam operated means arranged for actuation by said retardation cam as said cam supporting member is moved, and associated with said governor and said over-speed switch for changing the relative positions of the switch members of said over-speed switch, whereby said over-speed switch may be actuated with a relatively less expansion of said governor than normal.

10. In a hoisting engine controller of the character described comprising a shaft arranged for synchronism with a hoist drum of a mine hoist, a movable cam supporting member arranged to move when said shaft is rotated, a governor driven by said shaft, an over-speed alarm switch associated with said governor and arranged to be closed when said governor expands beyond a predetermined degree, a retardation cam carried by said cam supporting member, means arranged for actuation by said retardation cam and associated with said governor and said switch for moving the cooperating switch members of said switch so as to cause said switch to actuate when said governor has expanded to a degree less than normal, an acceleration cam carried by said cam supporting member and a cam operated acceleration switch arranged for actuation by said acceleration cam at substantially the same time that said retardation cam is engaged with said cam operated means.

11. In a hoisting engine controller of the character described comprising a shaft arranged for synchronism with a hoist drum of a mine hoist, a cam supporting dial arranged to move when said shaft is rotated; a governor driven by said shaft, an over-speed alarm switch associated with said governor and arranged to be closed when said governor expands beyond a predetermined degree, a retardation cam carried by said cam supporting dial, means arranged for actuation by said retardation cam and associated with said governor in said switch for moving the cooperating switch members of said switch so as to cause said switch to actuate when said governor has expanded to a degree less than normal, an acceleration switch arranged for actuation by said acceleration cam at substantially the same time that said retardation cam is engaged with said cam operated means.

12. In a hoisting engine controller of the character described comprising a shaft arranged for synchronism with a hoist drum of a mine hoist, a movable cam supporting member arranged to move when said shaft is rotated, a governor driven by said shaft, an over-speed alarm switch associated with said governor and arranged to be closed when said governor expands beyond a predetermined degree, a retardation cam carried by said cam supporting member, means arranged for actuation by said retardation cam and associated with said governor in said switch for moving the cooperating switch members of said switch so as to cause said switch to actuate when said governor has expanded to a degree less than normal, an acceleration cam carried by said cam supporting member, a cam operated acceleration switch arranged for actuation by said acceleration cam at substantially the same time that said retardation cam is engaged with said cam operated means, and electrically operated means arranged for actuation by the closing of said acceleration switch when said hoist drum is moving in one direction for counteracting the influence of said retardation cam upon said over-speed alarm switch.

13. In a device of the character described, a governor, an over-speed alarm switch, means actuated by the expansion of said governor for closing said switch, and electrically operated means associated with said first named means for moving the switch members of said switch apart from one another, thereby necessitating a greater normal expansion of said governor for the closing of said switch.

14. In a hoisting engine controller of the character described, a governor, a normally closed over-speed switch, a normally open alarm switch having one contact member associated with the movable element of said over-speed switch and the other contact arranged for movement, means associated with said governor and with said movable member of said alarm switch for causing the alarm switch members to move into engagement with one another, and upon further movement of said movable alarm switch member to cause said over-speed switch to open.

15. In a hoisting engine controller of the type described, a shaft arranged to be driven by and in synchronism with the hoist drum of a mine hoist, a movable cam supporting member arranged to move when said shaft is rotated, a governor driven by said shaft, an over-speed switch including a movable member associated with said governor and arranged to be actuated when said governor expands beyond a predetermined degree, a retardation cam carried by said cam supporting member, means arranged for actuation by said retardation cam and associated with said governor and said switch for influencing the movable element of said switch so as to cause said switch to actuate when said governor has expanded to a degree less than normal, an acceleration cam carried by said cam supporting member, and a cam operated acceleration switch arranged for actuation by said acceleration cam at substantially the same time that said retardation cam is engaged with said cam operated means.

16. In a hoisting engine controller of the type described, a shaft arranged for synchronism with the hoist drum of a mine hoist, a cam supporting dial arranged to move when said shaft is rotated, a governor driven by said shaft, an over-speed switch including a movable member associated with said governor and arranged to be actuated when said governor expands beyond a predetermined degree, a retardation cam carried by said cam supporting dial, means arranged for actuation by said retardation cam and associated with said governor and with said switch for influencing the movable element of said switch so as to cause said switch to actuate when said governor has expanded to a degree less than normal, an acceleration cam carried by said cam supporting dial, and a cam operated acceleration switch arranged for actuation by said acceleration cam at substantially the same time that said retardation cam is engaged with said cam operated means.

17. In a hoisting engine controller of the type described, a shaft arranged for connection and synchronism with a hoist drum, a movable cam supporting member arranged to move when said shaft is rotated, a governor driven by said shaft, an over-speed switch having a movable member associated with said governor and arranged to be actuated when said governor expands beyond a predetermined degree, a retardation cam carried by said cam supporting member and means arranged for actuation by said retardation cam and associated with said governor and the movable element of said switch for influencing the movable element of said switch so as to cause said switch to actuate when said governor has expanded to a degree less than normal.

18. In a hoisting engine controller of the type described, a shaft arranged for connection and synchronism with a hoist drum, a movable cam supporting member arranged to move when said shaft is rotated, a governor driven by said shaft, an over-speed switch having a movable member associated with said governor and arranged to be actuated when said governor expands beyond a predetermined degree, a retardation cam carried by said cam supporting member, means arranged for actuation by said retardation cam and associated with said governor and the movable element of said switch for influencing the movable element of said switch so as to cause said switch to actuate when said governor has expanded to a degree less than normal, an acceleration cam carried by said cam supporting member, a cam operated acceleration switch arranged for actuation by said acceleration cam at substantially the same time that said retardation cam is engaged with said cam operated means, and electrically operated means arranged for actuation by the closing of said acceleration switch when said hoist drum is moving in one direction for counteracting the influence of said retardation cam upon said over-speed switch.

19. In a device of the type described, a governor, an over-speed switch, means actuated by the expansion of said governor for opening said switch, and electrically operated means associated with said first named means for influencing the switch members so as to necessitate a greater than normal expansion of said governor for the opening of said switch.

20. In a device of the type described, a shaft, a cam supporting dial mounted concentric with said shaft, a plurality of cams disposed upon said dial, a plurality of cam operated mechanisms for actuation by said cams when said dial is rotated, means for advancing or retarding said dial upon shaft at will, and a signal switch arranged to actuate simultaneously with the movement of said dial relative to said shaft in one direction.

21. The combination with a valve, a falling weight for operating said valve, of means for varying the fall of said weight so as to regulate the actuation of said valve, said means including a wedge-shaped slidable member arranged to be interposed between said weight and a fixed support.

22. A hoisting engine controller of the type employed for controlling a brake engine having an electric controlling circuit used in connection with hoisting engines comprising a cam-operated limit switch, a shaft arranged for synchronism with the hoist drum of the hoist engine, a dial carried by said shaft, a cam carried by said dial adjacent the peripheral edge thereof for engagement with said cam-operated switch, said dial being arranged for adjustment on said shaft, whereby the engagement of said cam with said cam-operated switch may be effected at a predetermined time, an alarm bell, and means associated with said dial for operating said alarm bell as said cam operates said cam-operated switch.

23. In a hoist control device in combination a floating lever, a speed-responsive device operatively connected to one end of the lever so as to vary the position thereof, a pair of rotatable cams, means for rotating the cams at a speed proportional to the speed of a hoist, means secured to the other end of said floating lever and projecting into the path of said cams, whereby the latter will move the end of the lever, a normally closed switch, means comprising said cams for opening said switch at certain points in the travel of a hoist, a normally open switch, and means connected to the floating lever at a point intermediate its ends for closing said normally open switch under predetermined conditions.

24. In a device of the class described, a governor, a governor operated member, an overspeed switch, a movable cam, a movable member disposed in the path of said cam, a floating member having three fulcrum points, one of said points being connected with said movable member, one of said points being connected with said governor operated member, and one of said points being associated with said overspeed switch, whereby in case of abnormal governor speed with relation to the position of said cam, the movement of said floating member will cause said overspeed switch to be opened.

25. In a device of the class described, a governor, a governor operated member, an overspeed switch, a movable cam, a movable member disposed in the path of said cam, a floating member having three fulcrum points, one of said points being connected with said movable member, one of said points being connected with said governor operated member, and one of said points being associated with said overspeed switch, whereby said floating member cooperates with the movements of said governor operated member and said cam operated member to cause said overspeed switch to be opened under predetermined conditions.

26. In a device of the class described, a governor, a governor operated member, an electric switch, a cam, a floating member having three movable fulcrum points, means associated with the governor operated member to effect the movement of one of said fulcrum points, means associated with said cam to effect the movement of a second one of said fulcrum points, and means connecting with a third fulcrum point and associated with said switch whereby the action of said governor is made to cooperate with the action of said cam, to open said switch under predetermined conditions.

27. In a controller, the combination of a speed responsive device, with a floating member having a plurality of movable fulcrum points, an operative mechanical connection between said speed responsive device and one of said fulcrums, an overspeed switch having an operative mechanical connection to one of said fulcrums, and a deceleration control device having an operative mechanical connection to another of said fulcrums, whereby said overspeed switch is responsive to the movements of said speed responsive device and said deceleration control device.

28. In a controller, the combination of a speed responsive device, with a floating member having a plurality of movable fulcrum points, an operative mechanical connection between said speed responsive device and one of said fulcrums, an overspeed switch having an operative mechanical connection to one of said fulcrums, and a deceleration control device having an operative mechanical connection to another of said fulcrums, whereby said overspeed switch is responsive to the movements of said speed responsive device and said deceleration control device, and signal means controlled by said floating member and actuated to give a signal before said overspeed switch is actuated.

29. In a controller, the combination of a speed responsive device, with a floating member having a plurality of movable fulcrum points, an operative mechanical connection between said speed responsive device and one of said fulcrums, an overspeed switch having an operative mechanical connection to one of said fulcrums, and a deceleration control device having an operative mechanical connection to another of said fulcrums, whereby said overspeed switch is responsive to the movements of said speed responsive device and said deceleration control device, and means for changing the position of one of the fulcrums of said floating member to control said overspeed switch in accordance with different predetermined speed values under other conditions of service.

30. In a controller, the combination of a speed responsive device, with a floating member having a plurality of movable fulcrum points, an operative mechanical connection between said speed responsive device and one of said fulcrums, an overspeed switch having an operative mechanical connection to one of said fulcrums, and a deceleration control device having an operative mechanical connection to another of said fulcrums, whereby said overspeed switch is responsive to the movements of said speed responsive device and said deceleration control device, and means for removing said overspeed switch from the control of said deceleration control device during a predetermined movement of a controlled member away from a limit of travel of said controlled member.

31. In a hoist controller, the combination of a supporting frame with a movable member carried thereby and adapted to move in synchronism with a hoist, overspeed and deceleration control members for said hoist carried by said movable member, a switch having an operative mechanical connection with said overspeed and deceleration control members, and means for simultaneously shifting said overspeed and deceleration control members to change the predetermined speed control values under changed conditions of service.

32. In a controller, the combination of a governor with a controlled member, stopping means actuated by the expansion of said governor for stopping said controlled member, a deceleration control device associated with said governor and adapted to control said stopping means, and means associated with said governor and said stopping means for necessitating a greater expansion of said governor before actuating said stopping means during a predetermined movement of said controlled member away from a limit of travel of said controlled member.

In witness whereof, I hereunto subscribe my name this 24th day of May, 1927.

WILLIAM J. LILLY.

In witness whereof, I hereunto subscribe my name this 28th day of May, 1927.

HENRY H. LOGAN.